US005771361A

United States Patent [19]
Tokieda et al.

[11] Patent Number: 5,771,361
[45] Date of Patent: Jun. 23, 1998

[54] DATA PROCESSOR HAVING SHARED TERMINAL FOR MONITORING INTERNAL AND EXTERNAL MEMORY EVENTS

[75] Inventors: Yusuke Tokieda; Hiroshi Katsuta, both of Tokyo, Japan

[73] Assignee: NEC Corporation, Tokyo, Japan

[21] Appl. No.: 490,447

[22] Filed: Jun. 14, 1995

[30] Foreign Application Priority Data

Jun. 15, 1994 [JP] Japan .................................. 6-155471

[51] Int. Cl.$^6$ .................................................. G06F 13/00
[52] U.S. Cl. ........................................ 395/311; 395/865
[58] Field of Search .................................. 395/800, 311, 395/309, 568, 570, 304, 865

[56] References Cited

U.S. PATENT DOCUMENTS

| 4,434,474 | 2/1984 | Best | 377/64 |
| 4,479,178 | 10/1984 | Schabowski | 395/309 |
| 4,507,732 | 3/1985 | Catiller | 395/800 |
| 5,481,679 | 1/1996 | Higaki | 395/308 |
| 5,537,553 | 7/1996 | Kakiage | 395/280 |
| 5,537,602 | 7/1996 | Kametani | 395/800 |
| 5,588,124 | 12/1996 | Hongo | 395/287 |

FOREIGN PATENT DOCUMENTS 0 371 418  6/1990  European Pat. Off. .

OTHER PUBLICATIONS

Wiseman et al., "Modular Controllers for Future Engines", Machine Design, vol. 62, No. 17, pp. 93, 94, 96, 98 & 101, (1990).

Primary Examiner—Eric Coleman
Attorney, Agent, or Firm—Foley & Lardner

[57] ABSTRACT

In a data processor, an internal memory stores instruction codes and a central processing unit reads an instruction code form the memory and produces an external access request if it contains an instruction to access an external memory which is connected to an external terminal. A bus controller is responsive to the request for producing a data timing signal and one of read and write signals. An external address bus and an external data bus are connected to the bus controller. An internal address bus is connected to the CPU for transporting an internal address signal. A selecting circuit is responsive to a first mode switching signal for coupling one of the external address bus and the external data bus to the external terminal and determining the direction of the data signal transported by the external data bus when it is coupled to the external terminal in accordance with the data timing signal and one of the read and write signals, and responsive to a second mode switching signal for coupling the internal address bus to the external terminal in the absence of the data timing signal and the read and write signals. For an external memory having separate data and address terminals, a second external terminal is additionally provided for coupling the external address bus direct to the address terminal of the external memory through the second external terminal, instead of through the selecting circuit.

4 Claims, 5 Drawing Sheets

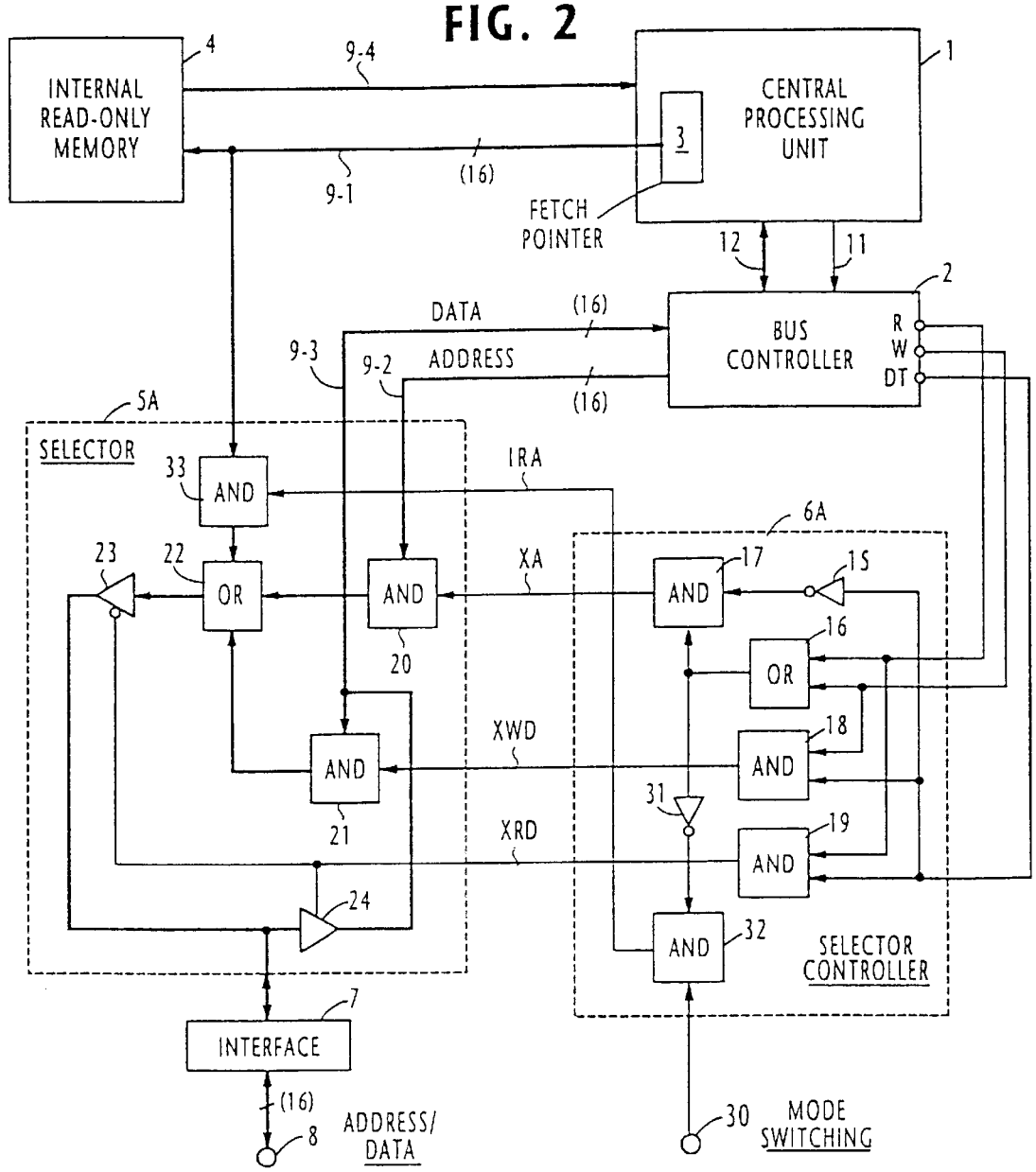

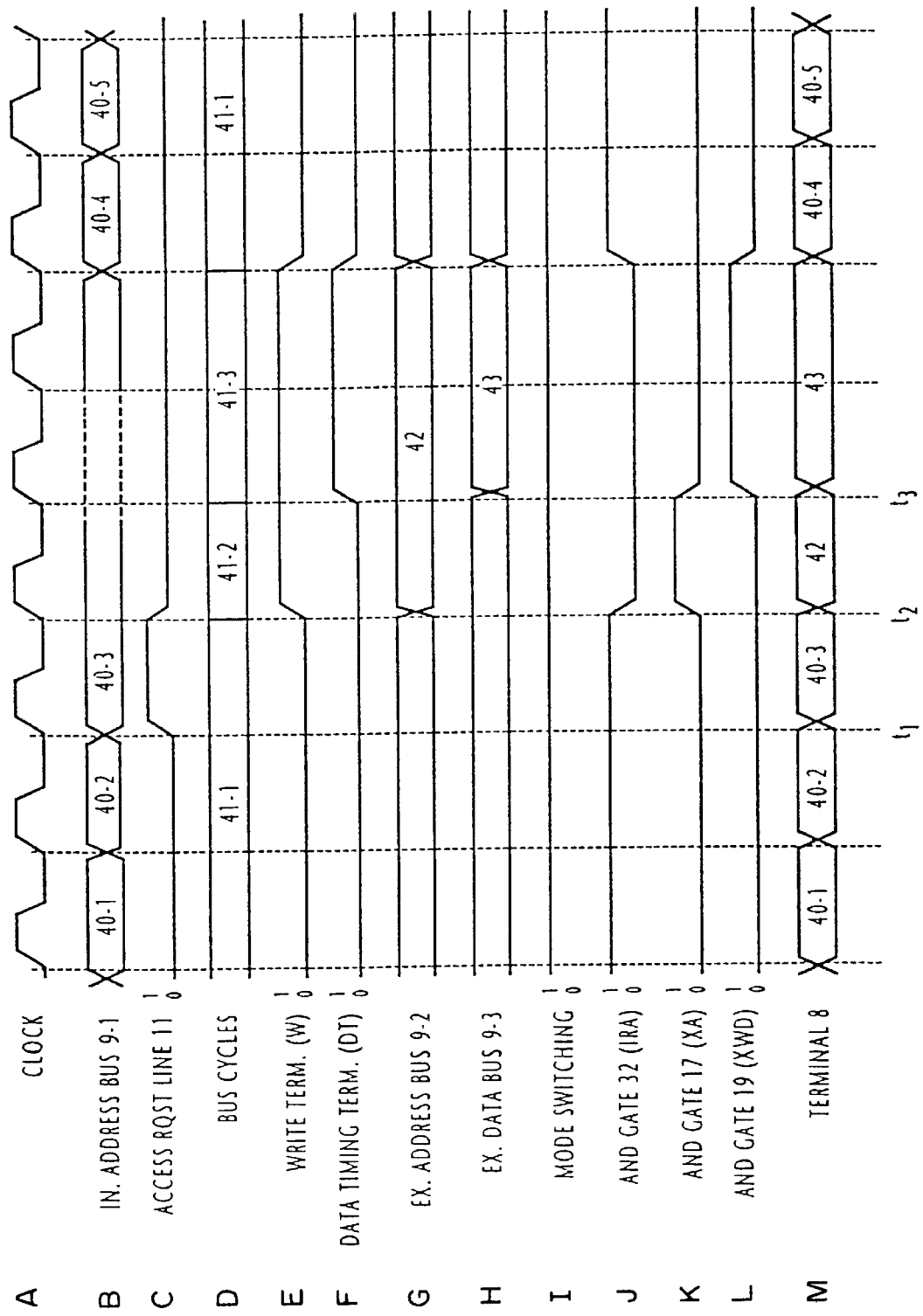

DATA PROCESSOR HAVING SHARED TERMINAL FOR MONITORING INTERNAL AND EXTERNAL MEMORY EVENTS

BACKGROUND OF THE INVENTION

1. Field of the Invention

The present invention relates generally to data processors, and more specifically to a technique for monitoring the operation of a data processor.

2. Description of the Related Art

In addition to an internal read-only memory and a central processing unit, data processors include a bus controller for controlling external memories, and a plurality of data input/output terminals. In a prior art data processor (FIG. 1), the central processing unit 1, when executing an instruction, issues an address signal specified by a fetch pointer 3 to a 16-bit wide internal ROM address bus 9-1 and reads a corresponding instruction code via an internal ROM data bus 9-4 from a location of the internal ROM 4 specified by the address signal, and decodes the instruction code to determine whether it is an external or internal access instruction. If the instruction is external access, the CPU applies a request signal through an external request line 11 to a bus controller 2 to invoke an external bus cycle for accessing an external memory, not shown, through an address/data terminal 8.

The external bus cycle consists of an address sub-cycle and a data sub-cycle. During the address sub-cycle, an external address signal is supplied to the external memory through a 16-bit wide external address bus 9-2 and during the data sub-cycle an external data signal is read into or out of the external memory through a 16-bit wide bus 9-3. The application of these signals to and from the bus controller 2 is via a selector 5 that is controlled by a selector controller 6 connected to the bus controller 2. For read and write operations, the bus controller 2 applies a logic-1 to terminals R and W, respectively, and a terminal DT. Depending on the logic states of the terminals R, W and DT, the selector controller 6 produces one of external address (XA), external write data (XWD), and external read data (XRD) select signals.

During an address sub-cycle that precedes a write operation, the terminals DT and W are at logic-0 and logic-1, respectively, producing a logic-1 at the outputs of an inverter 15 and an OR gate 16, thus activating an AND gate 17 to produce the external address (XA) select signal. This select signal is applied to an AND 20 of selector 5 for coupling a 16-bit address signal on bus 9-3 to a 3-state buffer 23 via an OR gate 22. The operation of the 3-state buffer 23 is controlled by the output state of an AND gate 19 of the selector controller 6. The 3-state buffer 23 functions as a gate for passing its 16-bit input signal to its output terminal only if the output of AND gate 19 is at logic-0. Otherwise, it switches to a turn-off state in which its output terminal is driven to a high impedance state. Since terminal DT is currently at logic-0, AND gate 19 is in a logic-0 state, and the 3-state buffer 23 is turned on to pass the address signal via interface 7 and terminal 8 to the external memory. During the subsequent write operation, the DT terminal is switched to logic-1 and an AND gate 18 is activated, producing the external write data (XWD) select signal, which is coupled to an AND gate 21 of selector 5, where a 16-bit write data signal on the data bus 9-2 is selected and coupled through OR gate 22, buffer 23, interface 7 and terminal 8 to the external memory. If an address sub-cycle is followed by a read operation, the DT terminal is switched to logic-1 and AND gate 19 is activated, producing a logic-1 which corresponds to the external write data (XRD) select signal. This signal is coupled to a 3-state buffer 24 as well as to the 3-state buffer 23. With the output of buffer 23 being switched to a high impedance state, the buffer 24 is enabled to function as a gate for applying to data bus 9-3 a read data signal which has been read from the external memory via terminal 8 and interface 7. Buffer 24 presents a high output impedance during the time the output of AND gate 19 is at logic-0, preventing the write data signal from buffer 23 being coupled to the data bus 9-3.

On the other hand, it is useful to monitor the operation of an internal memory to perform "in-circuit" debugging. While the events associated with the external memory can be simply monitored by attaching a monitor apparatus to the address/data terminal 8, the monitoring of the internal ROM 4 is currently done in one of two ways.

According to the first method, the data processor is provided with a mode switching terminal 10 and a 16-bit general purpose input/output terminal 13. A mode switching signal is applied to the terminal 10 for selectively connecting the internal ROM address bus 9-1 or a general-purpose I/O port 14 to the terminal 13. Specifically, when the mode switching signal is at logic-0, the port 14 is coupled to the terminal 13 for general-purpose use. When the mode switching signal is at logic-1, the address bus 9-4 is connected to the terminal 13 to send an internal ROM address to an external memory. The events associated with the ROM 4 are monitored by attaching the monitor apparatus to the terminal 13.

However, when making a debug, the general-purpose terminal cannot be used in the way as originally intended and inconvenience occurs. Installation of a new terminal exclusively for the monitoring purpose would be impractical because it requires an additional space and adds an extra cost.

The second prior art method uses a trap instruction. The function of the trap instruction is to save a currently executed address in a stack and allow control to jump to the location of a trap program for executing it. Specifically, trap instructions are installed at intervals in the instruction codes of the internal ROM 4. When each trap instruction is executed, an exception procedure is invoked and the address of the ROM 4 being executed is saved in a stack area of an external memory. This stack area serves as the point of monitor. However, because the general practice is to install a trap instruction on a per-routine basis, the second method results in a lowering or loss of visibility. Another shortcoming is that, by installing trap instructions, the amount of program is increased, and the utilization efficiency of the memory is decreased. Furthermore, each time a trap instruction is executed, control takes time to return to the program. Thus, the program execution must be suspended following the execution of each trap instruction. However, this results in a loss of real-time performance.

SUMMARY OF THE INVENTION

It is therefore an object of the present invention to provide a data processor which allows events associated both with internal and external memories to be monitored without increasing terminals and without loss of real-time performance.

According to a first aspect, the present invention provides a data processor comprising an internal memory for storing instruction codes, a central processing unit for reading an instruction code from the internal memory and producing an external access request if the instruction code contains an instruction to access an external memory, a bus controller responsive to the request for producing a data timing signal and one of read and write signals, an internal address bus for transporting an internal address signal produced by the central processing unit, an external address bus for transporting an external address signal from the bus controller, an external data bus for transporting a data signal to and from the bus controller, and an external terminal to which the external memory is connected. A selecting circuit is provided which is responsive to a first mode switching signal for coupling one of the external address bus and the external data bus to the external terminal and determining the direction of the data signal transported by the external data bus when same is coupled to the external terminal in accordance with the data timing signal and one of the read and write signals, and responsive to a second mode switching signal for coupling the internal address bus to the external terminal in the absence of the data timing signal and the read and write signals.

According to a second aspect, the present invention provides a data processor comprising an internal memory for storing instruction codes, a central processing unit for reading an instruction code from the internal memory and producing an external access request if the instruction code contains an instruction to access an external memory having separate address and data terminals, a bus controller responsive to the request for producing a data timing signal and one of read and write signals, an internal address bus for transporting an internal address signal produced by the central processing unit, an external data bus for transporting a data signal to and from the bus controller, a first external terminal to which the data terminal of the external memory is connected. A second external terminal is provided to permit the address terminal of the external memory to be connected thereto. An external address bus is connected to the second external terminal for transporting thereto an external address signal from the bus controller to the external memory. A selecting circuit is responsive to a first mode switching signal for coupling the external data bus to the external terminal and determining the direction of the data signal transported by the external data bus in accordance with the data timing signal and one of the read and write signals, and responsive to a second mode switching signal for coupling the internal address bus to the first external terminal in the absence of the data timing signal and the read and write signals.

BRIEF DESCRIPTION OF THE DRAWINGS

The present invention will be described in further detail with reference to the accompanying drawings, in which:

FIG. 2 is a block diagram of a data processor according to a first embodiment of the present invention for use with an external memory having a common address/data terminal;

FIG. 3 is a truth table illustrating the logic states of the selector and selector controller of FIG. 2;

FIG. 4 is a timing diagram for illustrating an operating mode of the embodiment of FIG. 2;

DETAILED DESCRIPTION

Figure 1:
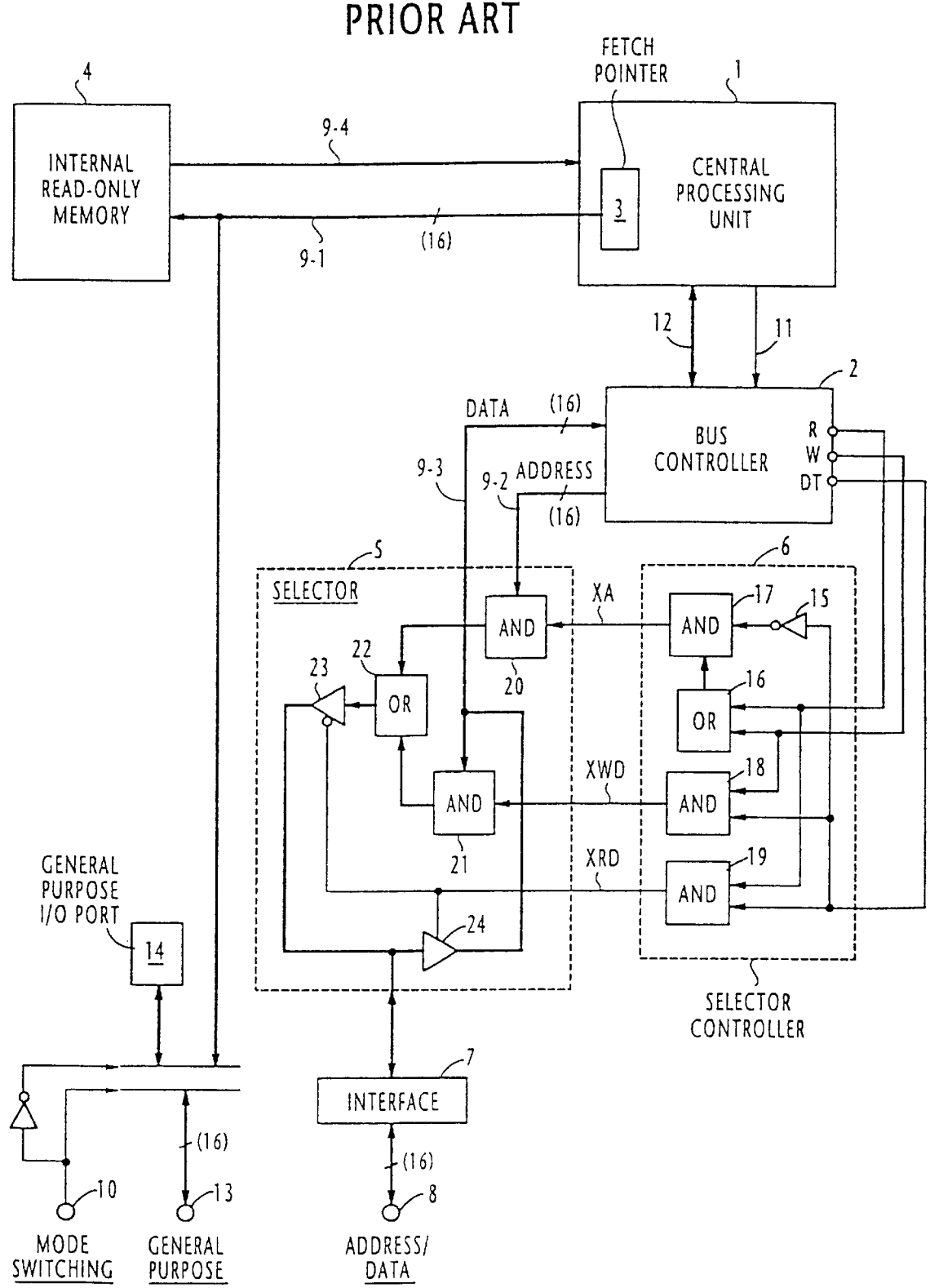
FIG. 1 is a block diagram of a prior art data processor for use with an external memory having a common address/data terminal.

Referring now to FIG. 2, there is shown a data processor according to a first embodiment of the present invention wherein parts corresponding to those in FIG. 1 are marked with the same reference numerals as used in FIG. 1. The data processor includes a mode switching terminal 30, a selector 5A and a selector controller 6A. The selector controller 6A differs from the prior art selector controller 6 by the inclusion of an inverter 31 at the output of OR gate 16 and an AND gate 32 for receiving the output of the OR gate 31 and a mode switching signal from the terminal 30 to produce an internal ROM address (IRA) select signal. The selector 5A additionally includes an AND gate 33 for receiving the IRA select signal for coupling the internal ROM address bus 9-1 to the 3-state buffer 23 via OR gate 22.

When the logic state of mode switching signal at terminal 30 is "0" and the data processor is accessing the external memory, external address and data signals on buses 9-2 and 9-3 are read into or out of the external memory through terminal 8 in a manner as indicated in a truth table in FIG. 3. In more detail, in the presence of a "1" at terminal R, a logic-0 at terminal DT causes the AND gate 17 to produce a logic-1 output, which is supplied to the AND gate 20 as an external address (XA) select signal. An address signal on address bus 9-2 is supplied to the external memory, not shown, which may be connected to the terminal 8. A logic-1 at terminal DT in the presence of a "1" at terminal R causes the AND gate 19 to produce a logic-1 output which is coupled to the buffers 23 and 24 as an external read data (XRD) select signal, thus allowing data from the external memory to be coupled to data bus 9-3. In the presence of a "1" at terminal W, a logic-0 at terminal DT causes the AND gate 17 to produce a logic-i output, which is supplied to the AND gate 20 as an external address (XA) select signal in the same manner as in the case of the read operation, and a corresponding address signal is supplied to the external memory. Subsequently, a logic-1 at terminal DT in the presence of a "1" at terminal W causes the AND gate 18 to produce a logic-1 output which is coupled to the AND gate 21 as an external write data (XRD) select signal, thus allowing data on bus 9-3 to be supplied to the external memory. If all the terminals R, W, DT are at logic-0, no select signals are supplied to the selector 5A.

When the logic state of mode switching signal at terminal 30 is "1" and the data processor is accessing the external memory, the selector controller 6A produces the signals XA, XWD and XRD in the same way as described above. When the mode switching terminal 30 is at logic-1 and all the terminals R, W and DT are at logic-0, the selector controller 6A produces no other signals than the internal ROM address (IRA) select signal from AND gate 32 as indicated in the rightmost column of the truth table.

A timing diagram shown in FIG. 4 illustrates the logic states of the signals of FIG. 2 during the time the mode switching signal terminal 30 is logic-1 to operate the system in the internal ROM address output mode. It shows transitions between an external access mode and an internal ROM address mode.

During periods 41-1, the internal ROM address (IRA) select signal is produced and internal ROM address signals 40-1, 40-2 and 40-3 are read out of the data processor through terminal 8 to an external memory before an external access mode begins and address signals 40-4 and 40-5 are supplied to the external memory after the external access mode ends.

If an external write instruction code is stored in a location specified by the internal ROM address signal 40-2, the CPU 1 decodes this instruction code, activating the external access request line 11 at clock instant $t_1$. In response to the next clock timing $t_2$, an address sub-cycle 41-2 begins and the terminal W changes to "1". Since the terminal DT of the bus controller 2 remains at logic-0 until time $t_3$, the output of AND gate 32 switches to logic-0, causing the internal ROM address (IRA) select signal to cease to exist, and allowing an external address (XA) select signal to appear from the output of AND gate 17. Thus, an external address signal 42 on address bus 9-2 is supplied to the external memory.

In response to the next clock timing $t_3$, a data sub-cycle 41-3 begins. During this sub-cycle, the logic state of the terminal DT changes to "1" and the output of AND gate 19 switches to logic-1 so that a data signal 43 on data bus 9-3 is supplied to the external memory. At the end of the data sub-cycle 41-3, the logic state of the terminal W changes to "0" and the output of AND gate 32 to change to "1" again, causing internal ROM address signals 40-4 and 40-5 on bus 9-1 to be successively supplied to terminal 8.

Figure 5:
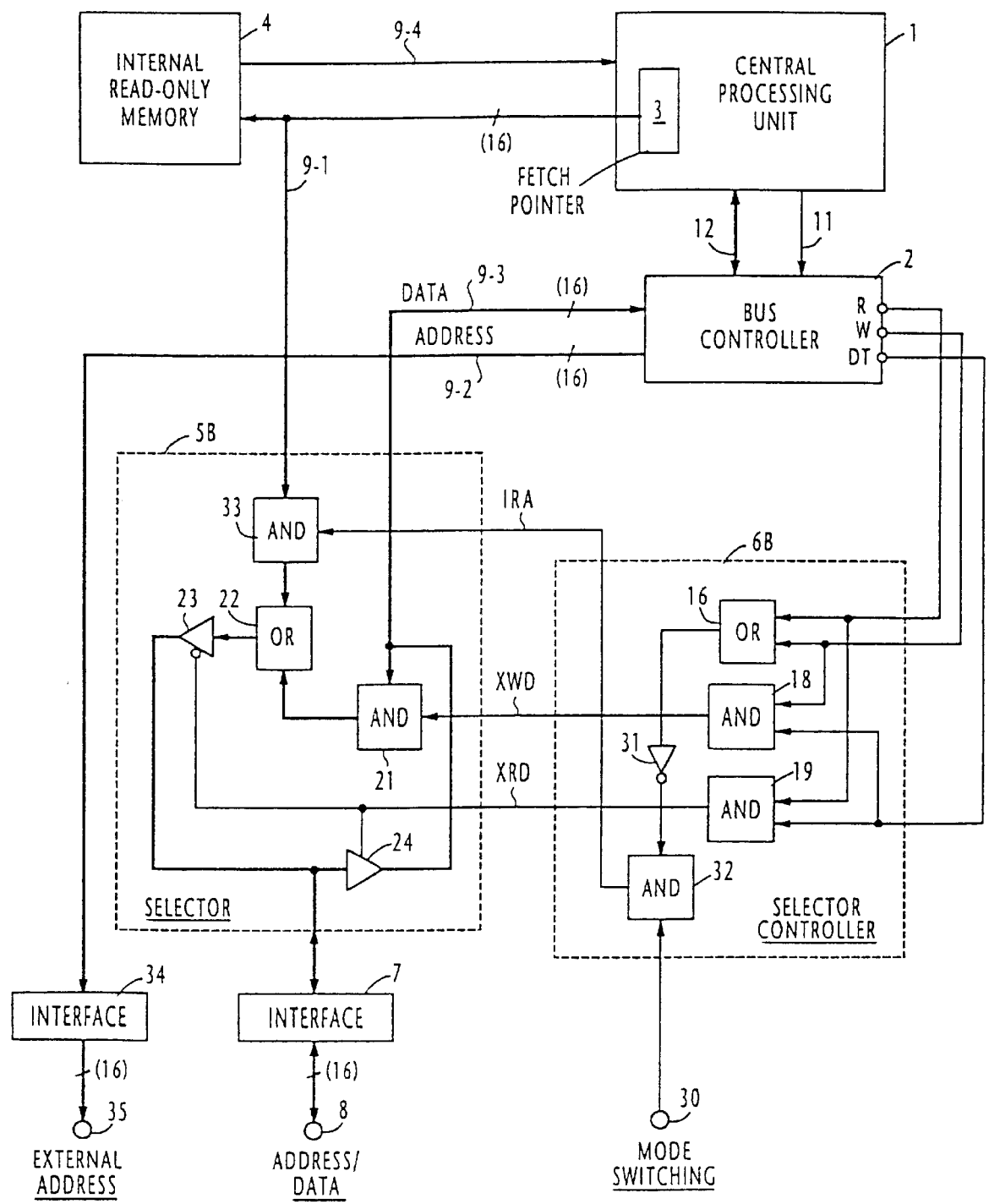
FIG. 5 is a block diagram of a data processor according to a second embodiment of the present invention for use with an external memory having separate address and data terminals.
Figure 6:
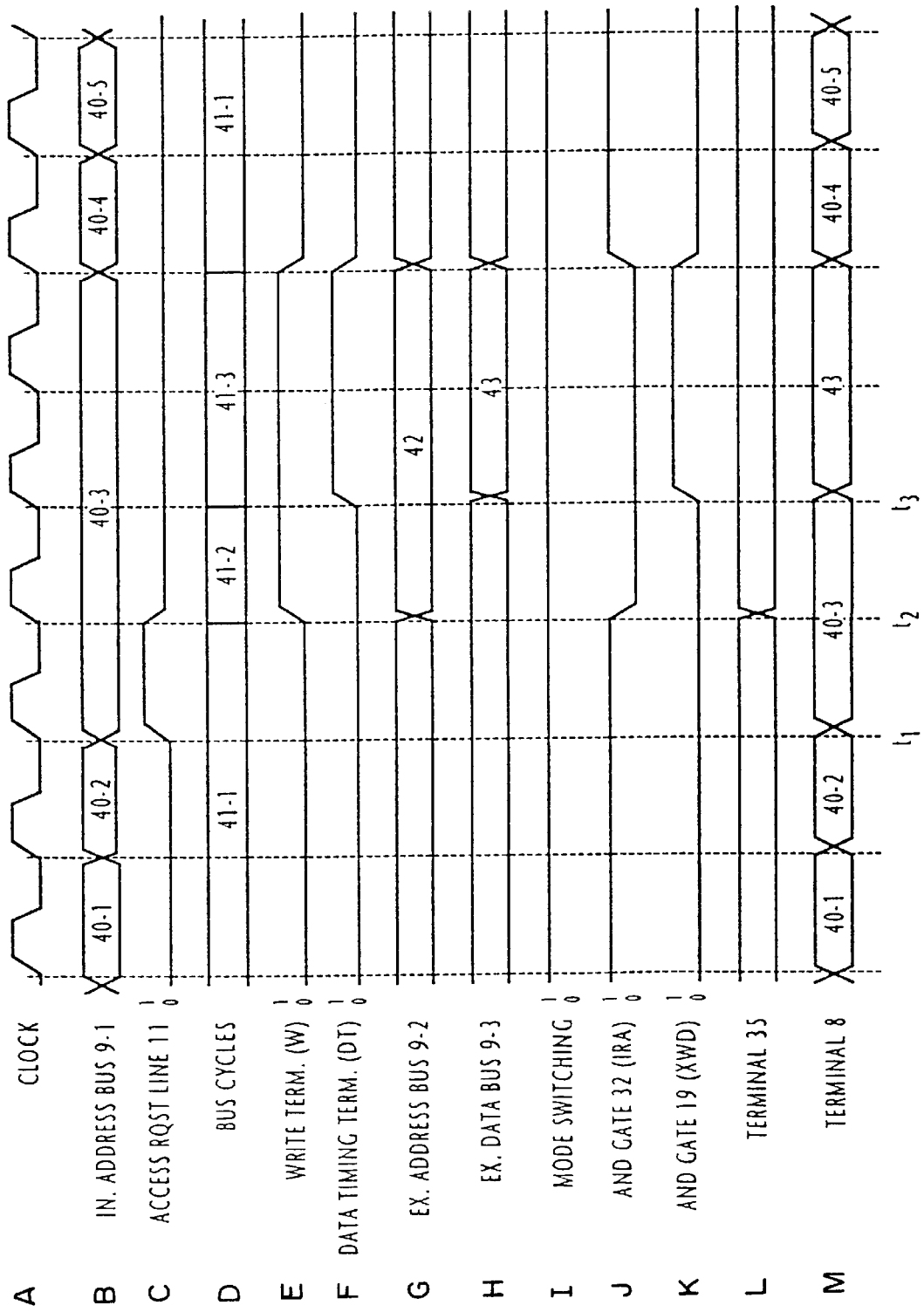
FIG. 6 is a timing diagram for illustrating an operating mode of the embodiment of FIG. 5.

The present invention can also be used for an external memory having separate data and address terminals. For this purpose, a second embodiment of the present invention is shown in FIG. 5. In this embodiment, the data processor includes an interface 34, an external address terminal 35, a selector 5B and a selector controller 6B. The address/data terminal 8 is connected to the data terminal of an external memory, not shown, and the address terminal 35 is connected to the address terminal of the external memory. The second embodiment differs from the previous embodiment in that the address bus 9-2 is connected through interface 34 to the external address terminal 35. It will be seen that there is no need to use the AND gates 17, 20 and inverter 15 of FIG. 2 in the selector controller 6B and selector 5B of FIG. 5. Thus, instead of producing an external address (XA) select signal from the selector controller for accessing through terminal 8 to the external memory, the bus controller 2 supplies an address signal 42 on bus 9-2 through the external address terminal 35 at clock timing $t_2$ as shown in FIG. 6.

What is claimed is:

1. A data processor for providing monitoring of an internal bus and an external address bus and data bus at a single external terminal, comprising:

an internal memory for storing instruction codes;

a central processing unit for reading an instruction code from the internal memory and producing an external access request if said instruction code contains an instruction to access an external memory;

a bus controller responsive to said request for producing a data timing signal and one of read and write signals;

an internal address bus for transporting an internal address signal produced by said central processing unit;

an external address bus for transporting an external address signal from said bus controller;

an external data bus for transporting a data signal to and from said bus controller;

an external terminal to which said external memory is connected; and a selecting circuit responsive to a first mode switching signal for coupling one of said external address bus and said external data bus to said external terminal and determining the direction of the data signal transported by the external data bus when same is coupled to said external terminal in accordance with said data timing signal and one of said read and write signals, and responsive to a second mode switching signal for coupling said internal address bus to said external terminal in the absence of said data timing signal and said read and write signals.

2. A data processor as claimed in claim 1, wherein said selecting circuit comprises:

a first inverter for receiving said data timing signal;

an OR gate for receiving said read and write signals;

a second inverter for receiving the output signal of said OR gate;

a first AND gate for receiving the output signals of said OR gate and said first inverter;

a second AND gate for receiving said write signal and said data timing signal;

a third AND gate for receiving the output signal of said second inverter and said mode switching signal;

a fourth AND gate for receiving said read signal and said data timing signal; and a selector responsive to the output signals of said first, second and third AND gates for establishing a first path between said external terminal and said external address bus, a second path between said external terminal and said external data bus and a third path between said external terminal and said internal address bus, respectively, and responsive to the output signal of said fourth AND gate for determining the direction of the data signal on said second path.

3. A data processor for providing monitoring of an internal bus and an external address bus and data bus at a single external terminal, comprising:

an internal memory for storing instruction codes;

a central processing unit for reading an instruction code from the internal memory and producing an external access request if said instruction code contains an instruction to access an external memory having separate address and data terminals;

a bus controller responsive to said request for producing a data timing signal and one of read and write signals;

an internal address bus for transporting an internal address signal produced by said central processing unit;

an external address bus for transporting an external address signal from said bus controller;

an external data bus for transporting a data signal to and from said bus controller;

a first external terminal to which the data terminal of said external memory is connected;

a selecting circuit responsive to a first mode switching signal for coupling said external data bus to said first external terminal and determining the direction of the data signal transported by the external data bus in accordance with said data timing signal and one of said read and write signals, and responsive to a second mode switching signal for coupling said internal address bus to first said external terminal in the absence of said data timing signal and said read and write signals;

a second external terminal to which the address terminal of said external memory is connected; and an external address bus connected to the second external terminal for transporting thereto an external address signal from said bus controller.

4. A data processor as claimed in claim 3, wherein said selecting circuit comprises:

an OR gate for receiving said read and write signals;

an inverter for receiving the output signal of said OR gate;

a first AND gate for receiving said write signal and said data timing signal;

a second AND gate for receiving the output signal of said second inverter and said mode switching signal;

a third AND gate for receiving said read signal and said data timing signal; and a selector responsive to the output signals of said first and second AND gates for establishing a first path between said external terminal and said external data bus and a second path between said external terminal and said internal address bus, respectively, and responsive to the output signal of said third AND gate for determining the direction of the data signal on said first path.

* * * * *